(12) United States Patent
Natarajan et al.

(10) Patent No.: US 11,394,703 B2
(45) Date of Patent: Jul. 19, 2022

(54) METHODS FOR FACILITATING FEDERATED SINGLE SIGN-ON (SSO) FOR INTERNAL WEB APPLICATIONS AND DEVICES THEREOF

(71) Applicant: F5 Networks, Inc., Seattle, WA (US)

(72) Inventors: Ravi Natarajan, San Jose, CA (US); Siarhei Miadzvezhanka, San Jose, CA (US)

(73) Assignee: F5, Inc., Seattle, WA (US)

( * ) Notice: Subject to any disclaimer, the term of this patent is extended or adjusted under 35 U.S.C. 154(b) by 17 days.

(21) Appl. No.: 16/784,302

(22) Filed: Feb. 7, 2020

(65) Prior Publication Data

US 2020/0259817 A1  Aug. 13, 2020

Related U.S. Application Data

(60) Provisional application No. 62/802,289, filed on Feb. 7, 2019.

(51) Int. Cl.
*G06F 21/00* (2013.01)
*H04L 9/40* (2022.01)

(52) U.S. Cl.
CPC ...... *H04L 63/0815* (2013.01); *H04L 63/0807* (2013.01); *H04L 63/0884* (2013.01); *H04L 63/0892* (2013.01)

(58) Field of Classification Search
CPC ..... G06F 21/60; H04L 63/08; H04L 63/0815; H04L 63/0807; H04L 63/0884; H04L 63/0892
USPC .......................................................... 726/8
See application file for complete search history.

(56) References Cited

U.S. PATENT DOCUMENTS

| | | | |
|---|---|---|---|
| 8,214,887 B2 * | 7/2012 | Clark | G06F 21/41 713/168 |
| 8,943,548 B2 | 1/2015 | Drokov | |
| 8,996,857 B1 * | 3/2015 | Akella | G06F 21/41 713/153 |
| 10,169,937 B1 | 1/2019 | Zwink | |

(Continued)

FOREIGN PATENT DOCUMENTS

WO    2010043722    4/2010

OTHER PUBLICATIONS

European Search Report for corresponding European Application Serial No. 20156087.7, dated Mar. 27, 2020.

(Continued)

*Primary Examiner* — Josnel Jeudy
(74) *Attorney, Agent, or Firm* — Troutman Pepper Hamilton Sanders LLP (Rochester)

(57) ABSTRACT

Methods, non-transitory computer readable media, secure proxy apparatuses, and network security systems that authenticate a user in response to a request to access a web application received from a client. The authenticated user is validated as authorized to access the web application. Security attribute data is then obtained for the user subsequent to the validation. The access request is forwarded to an internal application server hosting the web application and an authentication request is received in response to the forwarded access request. An SSO token is subsequently generated based on the obtained security attribute data. The generated SSO token is sent to the internal application server to facilitate access to the web application by the user.

20 Claims, 5 Drawing Sheets

(56) References Cited

U.S. PATENT DOCUMENTS

| | | | | |
|---|---|---|---|---|
| 10,382,426 | B2* | 8/2019 | Falodiya | H04L 63/0815 |
| 10,803,164 | B2* | 10/2020 | McClintock | G06F 21/41 |
| 10,972,453 | B1* | 4/2021 | Natarajan | H04L 63/0807 |
| 2003/0163733 | A1* | 8/2003 | Barriga-Caceres | H04L 67/04 |
| | | | | 726/5 |
| 2006/0021016 | A1* | 1/2006 | Birk | H04L 63/08 |
| | | | | 726/10 |
| 2008/0021997 | A1* | 1/2008 | Hinton | H04L 63/0815 |
| | | | | 709/225 |
| 2011/0004117 | A1 | 2/2011 | Burch et al. | |
| 2014/0337954 | A1* | 11/2014 | Ahmed | H04L 63/0815 |
| | | | | 726/8 |
| 2016/0021097 | A1 | 1/2016 | Shrotri | |
| 2016/0057140 | A1 | 2/2016 | Heeler | |
| 2017/0346815 | A1 | 11/2017 | Andrews | |
| 2018/0167378 | A1* | 6/2018 | Kostyukov | H04L 63/0815 |
| 2018/0219854 | A1 | 8/2018 | Miran et al. | |
| 2019/0036934 | A1 | 1/2019 | Pitchainnani | |
| 2019/0238554 | A1 | 8/2019 | Disraeli | |
| 2020/0034521 | A1 | 1/2020 | Teng | |
| 2020/0092181 | A1 | 3/2020 | Thiagarajan | |
| 2020/0137048 | A1 | 4/2020 | Doner | |

OTHER PUBLICATIONS

F5 Networks Inc., "BIG-IP® Access Policy Manager®: Application Access", manual, Nov. 15, 2017, 66 pages, Version 13.1, F5 Networks, Inc.

F5 Networks Inc., BIG-IP® Access Policy Manager®: Authentication and Single Sign-On, manual, Oct. 22, 2018, 394 pages, Version 13.1, F5 Networks, Inc.

F5 Networks Inc., "BIG-IP® Access Policy Manager®: Implementations", manual, Nov. 15, 2017, 136 pages, Version 13.1, F5 Networks, Inc.

F5 Networks Inc., "BIG-IP® Access Policy Manager®: Secure Web Gateway", manual, Aug. 16, 2018, 150 pages, Version 13.1, F5 Networks, Inc.

F5 Networks Inc., "BIG-IP® Access Policy Manager®: Portal Access", manual, Nov. 15, 2017, 80 pages, Version 13.1, F5 Networks, Inc.

F5 Networks Inc., "BIG-IP® Access Policy Manager®: Network Access", manual, Apr. 23, 2018, 104 pages, Version 13.1, F5 Networks, Inc.

F5 Networks Inc., "BIG-IP® Access Policy Manager®: Customization", Nov. 15, 2017, 106 pages, Version 13.1, F5 Networks, Inc.

Wang et al., "SoundAuth: Secure Zero-Effort Two-Factor Authentication Based on Audio Signals", Jun. 2018, 9 pages.

Microsoft, What is passwordless?, available at: https://docs.microsoft.com/en-us/azure/active-directory/authentication/mincept-authentication-passwordless; Aug. 15, 2019.

Microsoft, What are authentication methods?, available at: https://docs.microsoft.com/en-us/azure/active-directory/authenticationiconcept-authentication-passwordless; Aug. 4, 2019.

* cited by examiner

METHODS FOR FACILITATING FEDERATED SINGLE SIGN-ON (SSO) FOR INTERNAL WEB APPLICATIONS AND DEVICES THEREOF

This application claims the benefit of U.S. Provisional Patent Application Ser. No. 62/802,289, filed Feb. 7, 2019, which is hereby incorporated by reference in its entirety.

FIELD

This technology generally relates to network security and, more particularly, to methods and devices for facilitating federated single sign-on (SSO) for internal web applications.

BACKGROUND

Federated identity environments facilitate the secure exchange of identity information across domains. In such an environment, users of client devices are authenticated by an identity provider device, also referred to as an authorization server, which has access to user identity information. Following successful authentication, a client device may receive an access token that can be used to access protected resources, such as web applications hosted on internal application servers or other types of service provider devices.

In order to access the applications, the client devices may be provided a web desktop or other portal, which allows access to on-premises and software-as-a-service (SaaS) applications via different types of authentication schemes such as security assertion markup language (SAML), open authorization (OAuth), and NT LAN Manager (NTLM), for example. Irrespective of authentication scheme, the access token received from the identity provider device can be used to gain access to each of the applications for which a user has been validated, thereby facilitating what is commonly referred to as single sign-on (SSO) access control.

However, operational, business, or security requirements may dictate that particular web applications are hosted on an internal network that is not accessible from insecure, external, or public networks (e.g., the Internet). In these deployments, the web applications are not accessible by users of client devices that are not currently connected to the internal network, and therefore traditional identity federation protocols are incapable of being used to facilitate secure access. Without SSO access control, user access to authorized web applications is more difficult, time-consuming, and resource-intensive.

SUMMARY

A method for federated single sign-on (SSO) implemented by a network security system that includes one or more secure proxy apparatuses, identity provider devices, application servers, or client devices is disclosed. A user is authenticated in response to a request to access a web application received from a client. The authenticated user is validated as authorized to access the web application. Security attribute data is then obtained for the user subsequent to the validation. The access request is forwarded to an internal application server hosting the web application and an authentication request is received in response to the forwarded access request. An SSO token is subsequently generated based on the obtained security attribute data. The generated SSO token is sent to the internal application server to facilitate access to the web application by the user.

A secure proxy apparatus includes memory including programmed instructions stored thereon and one or more processors configured to be capable of executing the stored programmed instructions to authenticate a user in response to a request to access a web application received from a client. The authenticated user is validated as authorized to access the web application. Security attribute data is then obtained for the user subsequent to the validation. The access request is forwarded to an internal application server hosting the web application and an authentication request is received in response to the forwarded access request. An SSO token is subsequently generated based on the obtained security attribute data. The generated SSO token is sent to the internal application server to facilitate access to the web application by the user.

A non-transitory computer readable medium having stored thereon instructions for facilitating federated SSO includes executable code that, when executed by one or more processors, causes the processors to authenticate a user in response to a request to access a web application received from a client. The authenticated user is validated as authorized to access the web application. Security attribute data is then obtained for the user subsequent to the validation. The access request is forwarded to an internal application server hosting the web application and an authentication request is received in response to the forwarded access request. An SSO token is subsequently generated based on the obtained security attribute data. The generated SSO token is sent to the internal application server to facilitate access to the web application by the user.

A network security system includes one or more secure proxy apparatuses, identity provider devices, application servers, or client devices with memory comprising programmed instructions stored thereon, and one or more processors configured to be capable of executing the stored programmed instructions to authenticate a user in response to a request to access a web application received from a client. The authenticated user is validated as authorized to access the web application. Security attribute data is then obtained for the user subsequent to the validation. The access request is forwarded to an internal application server hosting the web application and an authentication request is received in response to the forwarded access request. An SSO token is subsequently generated based on the obtained security attribute data. The generated SSO token is sent to the internal application server to facilitate access to the web application by the user.

This technology has a number of associated advantages including methods, non-transitory computer readable media, secure proxy apparatuses, and network security systems that facilitate federated SSO for internal web applications. With this technology, client devices on external networks can securely access web applications hosted by internal application servers using SSO. This technology authenticates and validates a client device with an intermediary secure proxy apparatus prior to the client device communicating with internal application servers. The secure proxy apparatus then generates an SSO token useful by the external client device to access authorized web applications hosted on the internal network.

DETAILED DESCRIPTION

Figure 1:
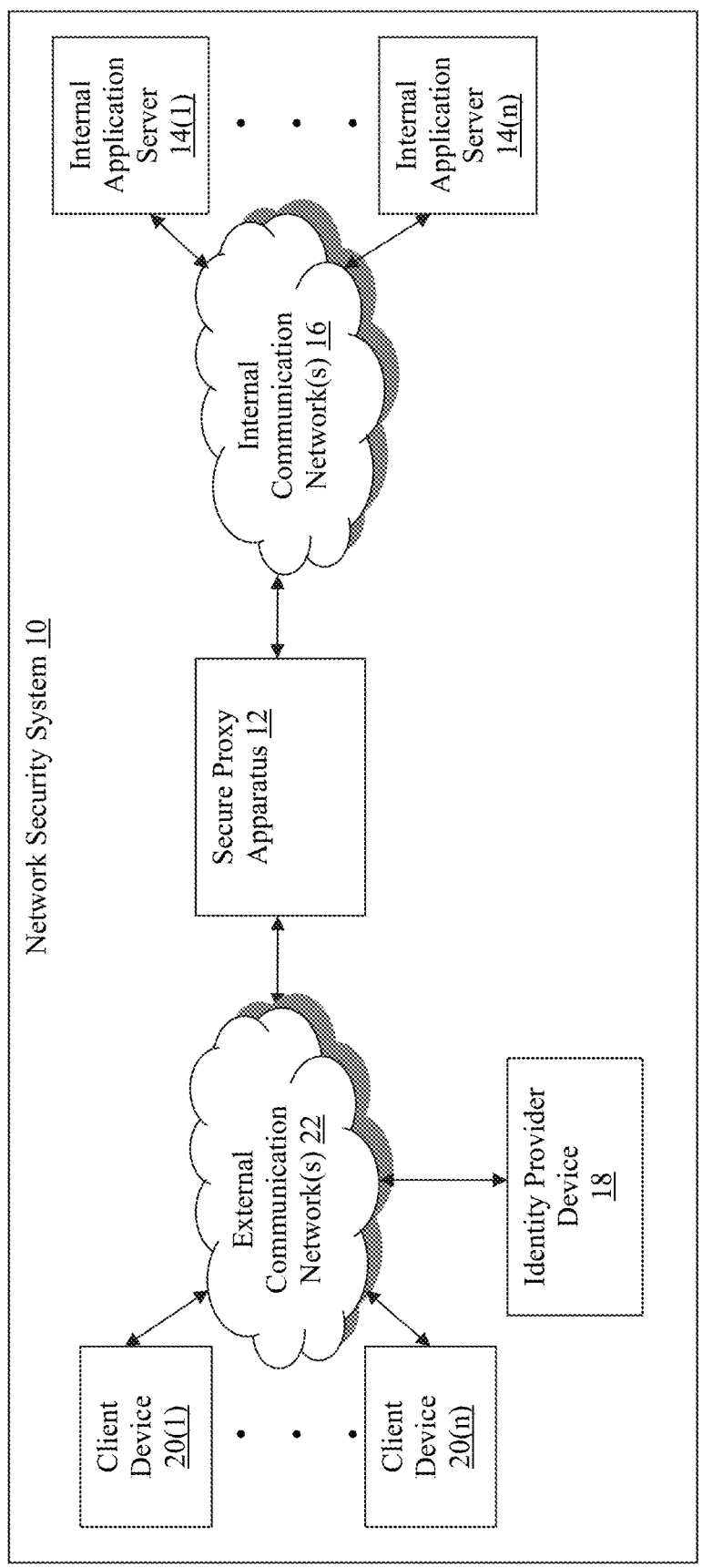
FIG. 1 is a block diagram of an exemplary network security system with a secure proxy apparatus.

Referring to FIG. 1, an exemplary network environment which incorporates an exemplary network security system 10 is illustrated. The network security system 10 in this example includes a secure proxy apparatus 12 that is coupled to application servers 14(1)-14(n) via internal communication network(s) 16 and an identity provider device 18 and client devices 20(1)-20(1) via external communication network(s) 22, although the secure proxy apparatus 12, internal application servers 14(1)-14(n), identity provider device 18, and/or client devices 20(1)-20(n) may be coupled together via other topologies. The network security system 10 may include other network devices such as one or more routers and/or switches, for example, which are well known in the art and thus will not be described herein. This technology provides a number of advantages including methods, non-transitory computer readable media, network security systems, and secure proxy apparatuses that advantageously facilitate federated single sign-on (SSO) from the external communication network(s) 22 for web applications hosted by the application servers 14(1)-14(n) in the internal communication network(s) 16.

In this particular example, the secure proxy apparatus 12, identity provider device 18, internal application servers 14(1)-14(n), and client devices 20(1)-20(n) are disclosed in FIG. 1 as dedicated hardware devices. However, one or more of the secure proxy apparatus 12, identity provider device 18, internal application servers 14(1)-14(n), or client devices 20(1)-20(n) can also be implemented in software within one or more other devices in the network security system 10. As used herein, the term "module" refers to either an implementation as a dedicated hardware device or apparatus, or an implementation in software hosted by another hardware device or apparatus that may be hosting one or more other software components or implementations.

As one example, the secure proxy apparatus 12, as well as any of its components or applications, can be a module implemented as software executing on one of the internal application servers 14(1)-14(n), and many other permutations and types of implementations can also be used in other examples. Moreover, any or all of the secure proxy apparatus 12, identity provider device 18, internal application servers 14(1)-14(n), or client devices 20(1)-20(n) can be implemented, and may be referred to herein, as a module.

Figure 2:
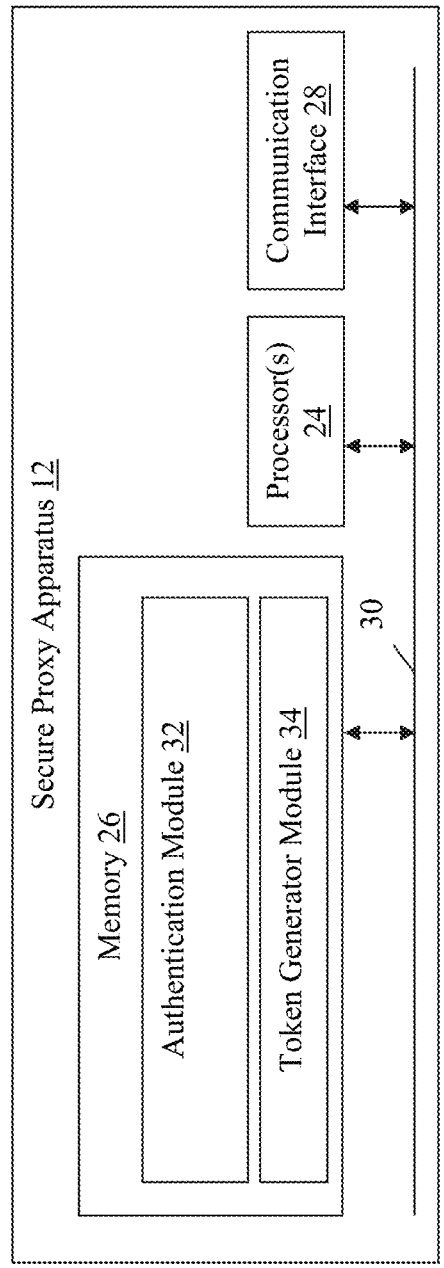
FIG. 2 is a block diagram of an exemplary secure proxy apparatus.

Referring to FIGS. 1-2, the secure proxy apparatus 12 may perform any number of functions including managing network traffic, load balancing network traffic across the internal application servers 14(1)-14(n), facilitating secure access to web applications hosted by the internal application servers 14(1)-14(n), and/or accelerating network traffic exchanged with web applications hosted by the internal application servers 14(1)-14(n), for example. The secure proxy apparatus 12 includes one or more processors 24, a memory 26, and/or a communication interface 28, which are coupled together by a bus 30 or other communication link, although the secure proxy apparatus 12 can include other types and/or numbers of elements in other configurations.

The processor(s) 24 of the secure proxy apparatus 12 may execute programmed instructions stored in the memory 26 of the secure proxy apparatus 12 for any number of the functions identified above. The processor(s) 24 of the secure proxy apparatus 12 may include one or more central processing units (CPUs) or general purpose processors with one or more processing cores, for example, although other types of processor(s) can also be used.

The memory 26 of the secure proxy apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives (SSDs), flash memory, or other computer readable medium which is read from and written to by a magnetic, optical, or other reading and writing system that is coupled to the processor(s) 24, can be used for the memory 26.

Accordingly, the memory 26 of the secure proxy apparatus 12 can store one or more applications that can include computer executable instructions that, when executed by the secure proxy apparatus 12, cause the secure proxy apparatus 12 to perform actions, such as to transmit, receive, or otherwise process messages, for example, and to perform other actions described and illustrated below with reference to FIGS. 3-5. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the secure proxy apparatus 12 itself, may be located in virtual server(s) running in a cloud-based computing environment rather than being tied to one or more specific physical network computing devices. Also, the application(s) may be running in one or more virtual machines (VMs) executing on the secure proxy apparatus 12. Additionally, in one or more examples of this technology, virtual machine(s) running on the secure proxy apparatus 12 may be managed or supervised by a hypervisor.

In this particular example, the memory 26 of the secure proxy apparatus 12 includes an authentication module 32 and a token generator module 34, although the memory 26 can include other policies, modules, databases, or applications, for example. The authentication module 32 is configured to process login requests received from the client devices 20(1)-20(n) and authenticate users of the client devices 20(1)-20(n). In one particular example, the authentication module 32 extracts credentials from received login requests, obtains authorization grant codes from the identity provider device 18, and obtains access tokens or assertions (commonly referred to herein as access tokens) from the identity provider device 18, although other methods (e.g., local authentication, authorization, and accounting (AAA) methods) can also be used in other examples.

The token generator module 34 in this example obtains security attribute data for users (e.g., from the access tokens obtained by the authentication module 32) and generates SSO tokens or assertions (commonly referred to herein as SSO tokens). The token generator module 34 then communicates the SSO tokens to web applications hosted by the internal application servers 14(1)-14(n) to facilitate secure access by the uses of the client devices 20(1)-20(n), as described and illustrated in more detail later with reference to FIGS. 3-5.

Referring back to FIGS. 1-2, the communication interface 28 of the secure proxy apparatus 12 operatively couples and communicates between the secure proxy apparatus 12, internal application servers 14(1)-14(n), identity provider device 18, and/or client devices 20(1)-20(n), which are all coupled together by the internal and external communication network(s) 16 and 22, respectively, although other types and/or numbers of communication networks or systems with other types and/or numbers of connections and/or configurations to other devices and/or elements can also be used.

By way of example only, the internal and/or external communication network(s) 16 and 22, respectively, can include local area network(s) (LAN(s)) or wide area network(s) (WAN(s)), and can use TCP/IP over Ethernet and industry-standard protocols, although other types or numbers of protocols or communication networks can be used. The internal and/or external communication network(s) 16 and 22, respectively, in this example can employ any suitable interface mechanisms and network communication technologies including, for example, Ethernet-based Packet Data Networks (PDNs).

While the secure proxy apparatus 12 is illustrated in this example as including a single device, the secure proxy apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the secure proxy apparatus 12.

Additionally, one or more of the devices that together comprise the secure proxy apparatus 12 in other examples can be standalone devices or integrated with one or more other devices or apparatuses, such as one of the internal application servers 14(1)-14(n), for example. Moreover, one or more of the devices of the secure proxy apparatus 12 in these examples can be in a same or a different communication network including one or more public, private, or cloud networks, for example.

The identity provider device 18 in this example includes one or more processors, a memory, and a communication interface, which are coupled together by a bus or other communication link, although other numbers and/or types of network devices could be used. The identity provider device 18 is an authoritative source for identity information for users of the client devices 20(1)-20(n) and is configured to provide AAA services on behalf of the network security system 10. Accordingly, the identity provider device 18 provides authorization grant codes and access tokens to the client devices 20(1)-20(n) to facilitate SSO in the network security system 10. The identity provider device 18 can also facilitate validation of access tokens in some examples.

Each of the internal application servers 14(1)-14(n) in this example includes one or more processors, a memory, and a communication interface, which are coupled together by a bus or other communication link, although other numbers and/or types of network devices could be used. The internal application servers 14(1)-14(n) in this example process requests from the client devices 20(1)-20(n) via the external communication network(s) 22 according to the HTTP-based application RFC protocol, for example, which are proxied by the secure proxy apparatus 12.

Once users are authenticated and validated by the secure proxy apparatus 12, the secure proxy apparatus 12 provides SSO tokens in response to authentication requests from the web applications, which validate the SSO tokens and exchange application data with the client devices 20(1)-20(n). Various applications may be operating on the internal application servers 14(1)-14(n) and transmitting data (e.g., files or Web pages) to the client devices 20(1)-20(n) in response to requests from the client devices 20(1)-20(n). The internal application servers 14(1)-14(n) may be hardware or software or may represent a system with multiple servers in a pool, which may include internal or external networks.

Although the internal application servers 14(1)-14(n) are illustrated as single devices, one or more actions of the internal application servers 14(1)-14(n) may be distributed across one or more distinct network computing devices that together comprise one or more of the internal application servers 14(1)-14(n). Moreover, the internal application servers 14(1)-14(n) are not limited to a particular configuration. Thus, the internal application servers 14(1)-14(n) may contain a plurality of network computing devices that operate using a master/slave approach, whereby one of the network computing devices of one or more of the internal application servers 14(1)-14(n) operate to manage and/or otherwise coordinate operations of the other network computing devices. The internal application servers 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the internal application servers 14(1)-14(n) can operate within the secure proxy apparatus 12 itself rather than as a stand-alone server communicating with the secure proxy apparatus 12 via the internal communication network(s) 16. In this example, the one or more of the internal application servers 14(1)-14(n) operate within the memory of the secure proxy apparatus 12.

The client devices 20(1)-20(n) of the network security system 10 in this example include any type of computing device that can exchange network data, such as mobile, desktop, laptop, or tablet computing devices, virtual machines (including cloud-based computers), or the like. Each of the client devices 20(1)-20(n) in this example includes a processor, a memory, and a communication interface, which are coupled together by a bus or other communication link, although other numbers or types of components could also be used.

The client devices 20(1)-20(n) may run interface applications, such as standard web browsers or standalone client applications, which may provide an interface to make requests for, and receive content stored on, one or more of the application servers 14(1)-14(n) via the external communication network(s) 22. The client devices 20(1)-20(n) may further include a display device, such as a display screen or touchscreen, or an input device, such as a keyboard for example.

Although the exemplary network security system 10 with the secure proxy apparatus 12, internal application servers 14(1)-14(n), identity provider device 18, and client devices 20(1)-20(n) is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system, such as the secure proxy apparatus 12, internal application servers 14(1)-14(n), identity provider device 18, or client devices 20(1)-20(n), for example, may be configured to operate as virtual instances on the same physical machine. In other words, one or more of the secure proxy apparatus 12, internal application servers 14(1)-14(n), identity provider device 18, or client devices 20(1)-20(n) may operate on the same physical device rather than as separate devices communicating through communication network(s) or other types of connections. Additionally, there may be more or fewer secure proxy apparatuses, internal application servers, identity provider devices, or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 26 of the secure proxy apparatus 12, for one or more aspects of the present technology, as described and illustrated by way of the examples herein. The instructions in some examples include executable code that, when executed by one or more processors, such as the processor(s) 24 of the secure proxy apparatus 12, cause the processors to carry out steps necessary to implement the methods of the examples of this technology that are described and illustrated herein.

Figure 3:
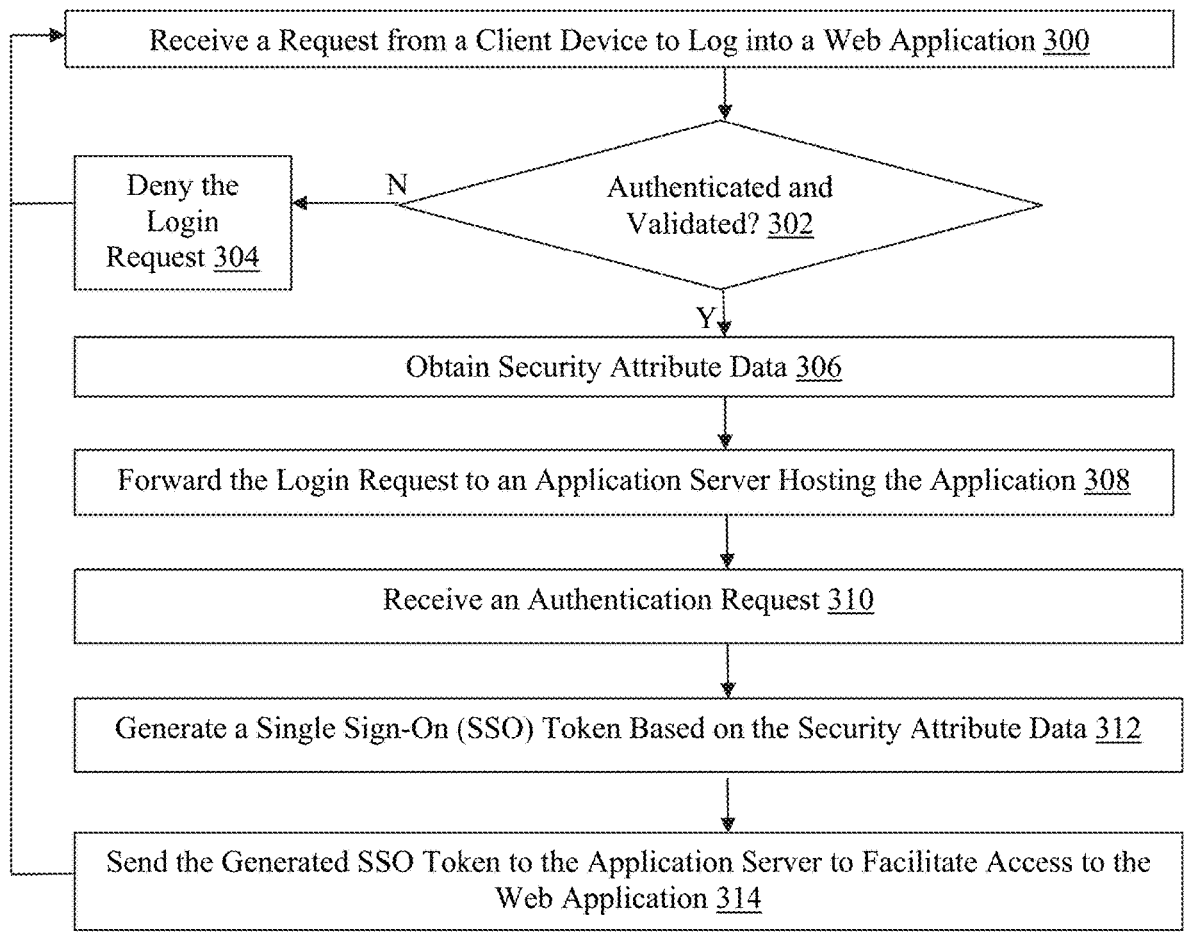
FIG. 3 is a flowchart of an exemplary method for flowchart of an exemplary method for facilitating federated SSO for internal web applications using local authentication.

Referring more specifically to FIG. 3, a flowchart of an exemplary method for facilitating federated SSO for the internal web applications 14(1)-14(n) using local authentication is illustrated. In step 300 in this example, the secure proxy apparatus 12 intercepts a request from one of the client devices 20(1)-20(n) to log into a web application hosted by one of the internal application servers 14(1)-14(n) hosted behind the secure proxy apparatus 12. Accordingly, the secure proxy apparatus 12 is effectively disposed between the one of the client devices 20(1)-20(n) and the one of the internal application servers 14(1)-14(n).

In step 302, the secure proxy apparatus 12 determines whether the user is authenticated and validated. In this particular example, the secure proxy apparatus 12 performs a local or internal authentication and validation using credentials (e.g., user name and password) included in the login request, although in other examples, the secure proxy apparatus 12 can perform an external authentication and/or validation, such as using the identity provider device 18 (e.g., by sending the credentials to the identity provider device 18 or redirecting the one of the client devices 20(1)-20(n) to the identity provider device 18), as described and illustrated in more detail later with reference to FIGS. 4-5. In yet other examples, a combination of internal and external authentication and/or validation can be used.

To perform the local or internal authentication and validation in this example, the secure proxy apparatus can perform a client certificate authentication and/or initiate an AAA query using the credentials or other details included in the login request for the user of the one of the client devices 20(1)-20(n). The user details can be sent by the secure proxy apparatus 12 via queries to a backend active directory (AD) and/or lightweight directory access protocol (LDAP) server, for example, to determine whether the user is authorized and validated to access the particular web application to which the login request received in step 300 was directed. Other methods for authenticating and validating users can also be used. If the secure proxy apparatus 12 determines that the user of the one of the client devices 20(1)-20(n) is not authenticated or validated, then the No branch is taken to step 304.

In step 304, the secure proxy apparatus 12 denies the login request, such as by dropping the login request or sending a response to the one of the client devices 20(1)-20(n) indicating the failure to authenticate and requesting re-submission of credentials, for example, although other methods for denying the login request can also be used. However, if the secure proxy apparatus 12 determines that the user of the one of the client devices 20(1)-20(n) is authenticated and validated, then the Yes branch is taken to step 306.

In step 306, the secure proxy apparatus 12 obtains security attribute data. The security attribute data can include the credentials, other user details contained within the login request, and/or information obtained via one or more AAA queries (e.g., AD or LDAP), and one or more portions of the security attribute data can be obtained in other manners. Accordingly, the security attribute data can include a user name, user group, contact information (e.g., e-mail or phone number), role, and/or scope (e.g., an indication of accessible or authorized web applications), for example. Other information can also be included in the security attribute data in other examples.

In step 308, the secure proxy apparatus 12 sends the login request to one of the internal application servers 14(1)-14(n) hosting the web application to which the login request received in step 300 was directed. Accordingly, the secure proxy apparatus 12 proxies the login request to the one of the internal application servers 14(1)-14(n) via the internal communication networks 16 that are not directly accessible by the one of the client devices 20(1)-20(n).

In step 310, the secure proxy apparatus 12 receives an authentication request. In this particular example, the secure proxy apparatus 12 is acting as the identity provider and, accordingly, the one of the internal application servers 14(1)-14(n) effectively redirects the one of the client devices 20(1)-20(n) to the secure proxy apparatus 12 for authentication. The one of the client devices 20(1)-20(n) then follows the redirect request from the one of the internal application servers 14(1)-14(n) by sending an authentication request to the secure proxy apparatus 12, which is received by the secure proxy apparatus 12 in step 310.

In step 312, the secure proxy apparatus 12 consumes the authentication request received in step 310 and generates an SSO token based on the security attribute data that was obtained in step 306. Accordingly, the secure proxy apparatus 12 effectively responds to the authentication request on behalf of the previously authenticated and validated one of the client devices 20(1)-20(n) by providing an SSO token that will be accepted by the web application hosted by the one of the internal application servers 14(1)-14(n).

In step 314, the secure proxy apparatus 12 sends the generated SSO token to the one of the internal application servers 14(1)-14(n) in order to facilitate access to the web application by the one of the client devices 20(1)-20(n). The secure proxy apparatus 12 effectively releases the initial login request received in step 300 to the one of the internal application servers 14(1)-14(n) along with the generated SSO token. The SSO token is in a format that can be validated or accepted by the web application in this example.

Subsequent to validating or accepting the SSO token, the one of the internal application servers 14(1)-14(n) can respond with an acceptance of the login request. The secure proxy apparatus 12 can communicate the acceptance to the one of the client devices 20(1)-20(n) and establish a session between the one of the client devices 20(1)-20(n) and the one of the internal application servers 14(1)-14(n) to facilitate the exchange of application data.

Accordingly, this technology securely facilitates federated SSO for web applications on the internal communication network(s) 16. In particular, the one of the client devices 20(1)-20(n) is only provided access to the internal communication network(s) 16, web application, and one of the internal application servers 14(1)-14(n), via the SSO token generated by the secure proxy apparatus 12, subsequent to the associated user being authenticated and validated by the secure proxy apparatus 12.

Subsequent to sending the generated SSO token in step 314, the secure proxy apparatus 12 optionally proceeds back to step 300 and receives another request from another one of the client devices 20(1)-20(n) to log into a web application. In other examples, one or more of steps 300-314 can occur in a different order and/or in parallel. For example, the secure proxy apparatus 12 can generate the SSO token prior to, or in parallel with, one or more of forwarding the login request to, or receiving the authentication from, the one of the internal application servers 14(1)-14(n), and other permutations are also possible.

Figure 4:
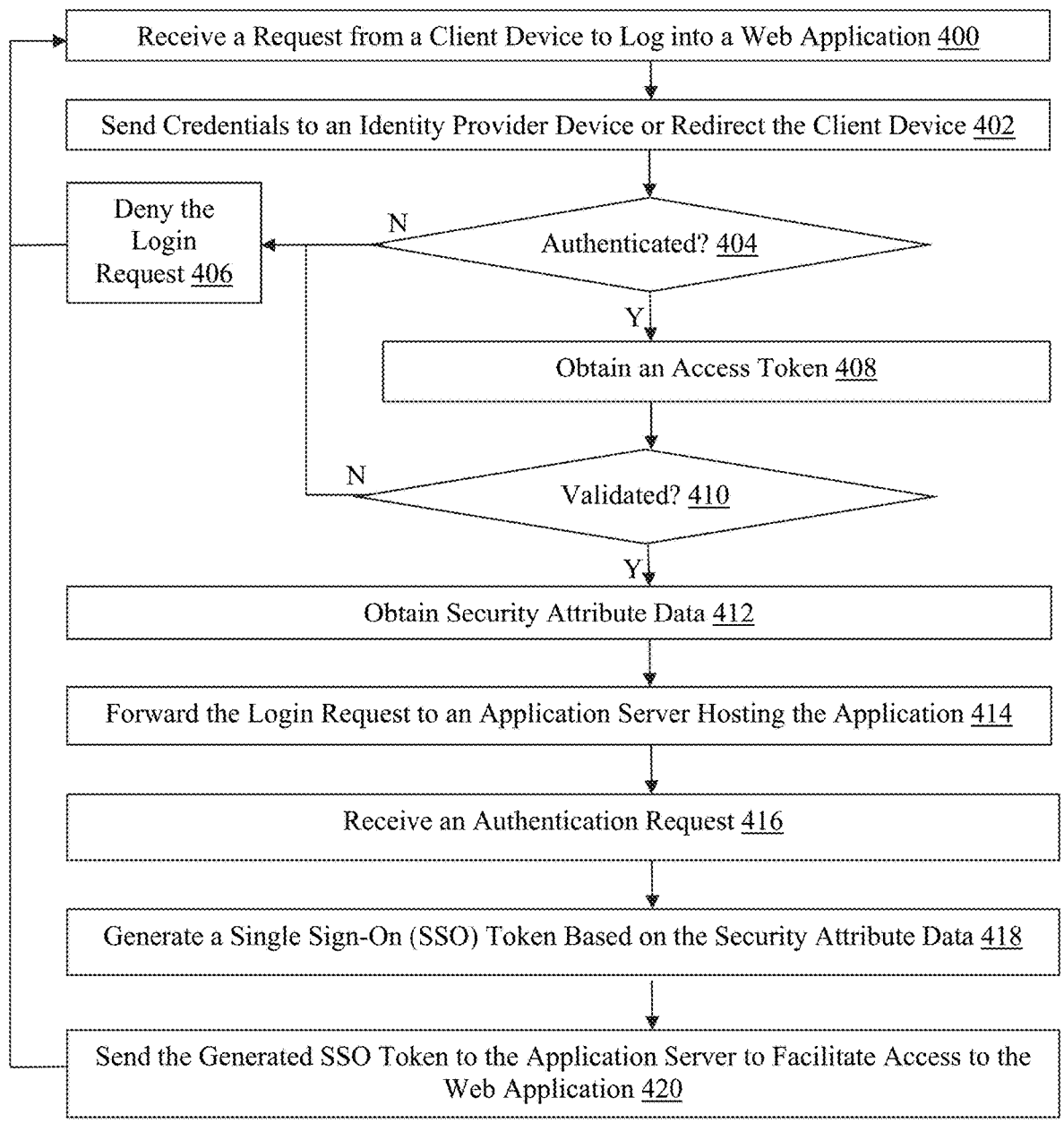
FIG. 4 is a flowchart of an exemplary method for flowchart of an exemplary method for facilitating federated SSO for internal web applications using external authentication.

Referring more specifically to FIG. 4, a flowchart of an exemplary method for facilitating federated SSO for internal web applications using external authentication via the identity provider device 18 is illustrated. In step 400 in this example, the secure proxy apparatus 12 receives a request from one of the client devices 20(1)-20(n) to log into a web application hosted by one of the internal application servers 14(1)-14(n), as described and illustrated in more detail earlier with reference to step 300 of FIG. 3.

In step 402, the secure proxy apparatus 12 collects credentials from the user of the one of the client devices (e.g., as included in the login request) and sends the credentials to the identity provider device 18 via the external communication network(s) 22 as part of an authentication request. In another example, the secure proxy apparatus 12 redirects the one of the client devices 20(1)-20(n) to the identity provider device 18, which collects the credentials from the one of the client devices 20(1)-20(n) and authenticates the user.

The identity provider device 18 stores the identity and other information for allowed users, which can be compared to the credentials to generate an authentication result that can facilitate SSO access to any number of web applications hosted by the internal application servers 14(1)-14(n). In one particular example, the credentials can be sent by the identity provider device 18 to a backend AD or LDAP server, although other methods of authenticating the user can be used in other examples. Upon a successful authentication, the identity provider device 18 generates an access token and redirects the one of the client devices 20(1)-20(n) back to the secure proxy apparatus 12 along with the generated access token. When the authentication fails, the user is redirected with an error message to the secure proxy apparatus 12, for example.

In step 404, the secure proxy apparatus 12 determines whether the user of the one of the client devices 20(1)-20(n) is authenticated. The determination in step 404 can be made based on a positive or negative authentication result received from the identity provider device 18. In one example, the identity provider device 18 can respond to the credentials with a positive authentication result including an authorization grant code and/or an access token, although other types of authentication results and/or methods of determining whether the user was authenticated can also be used. If the secure proxy apparatus 12 receives a negative authorization result or otherwise determines that the user of the one of the client devices 20(1)-20(n) was not authenticated, then the one of the client devices is redirected back to the secure proxy apparatus 12 with an error message and the No branch is taken to step 406.

In step 406, the secure proxy apparatus denies the login request, such as by dropping the login request or sending a response to the one of the client devices 20(1)-20(n) indicating the failure to authenticate and requesting re-submission of credentials, for example, although other methods for denying the login request can also be used, as described and illustrated in more detail earlier with reference to step 304 of FIG. 3. However, if the secure proxy apparatus 12 determines in step 406 that the user of the one of the client devices 20(1)-20(n) was authenticated, then the Yes branch is taken to step 408.

In step 408, the secure proxy apparatus 12 obtains at least an access token from the identity provider device 18. In one example, the secure proxy apparatus 12 can send an authorization grant code, received in response to the credentials and with a positive authentication result, to the identity provider device 18 with a request for the access token, although other methods for obtaining the access token can also be used in other examples.

In step 410, the secure proxy apparatus 12 determines whether the user of the one of the client devices 20(1)-20(n) is validated or authorized to access the web application to which the login request received in step 400 was directed. In one example, the access token can include a scope identifying the web application(s) that the user is authorized to access, although other methods of validating the user can also be used. If the secure proxy apparatus 12 determines that the user is not validated, then the No branch is taken to step 406 in this example, and the login request is denied. However, if the secure proxy apparatus 12 determines in step 410 that the user is validated, then the Yes branch is taken to step 412.

In step 412, the secure proxy apparatus 12 obtains security attribute data, such as via any of the methods described and illustrated earlier with reference to step 306 of FIG. 3, for example. Instead, or in addition, the secure proxy apparatus 12 can extract one or more portions of the security attribute data from the access token obtained in step 408 in this example. Steps 414, 416, 418, and 420 can then proceed as described and illustrated in detail earlier with reference to steps 308, 310, 312, and 314 of FIG. 3, respectively. Accordingly, irrespective of the authentication and/or validation method, the secure proxy apparatus 12 advantageously authenticates and validates users prior to providing secure access to the web applications hosted by the internal application servers 14(1)-14(n) via a generated SSO token.

Figure 5:
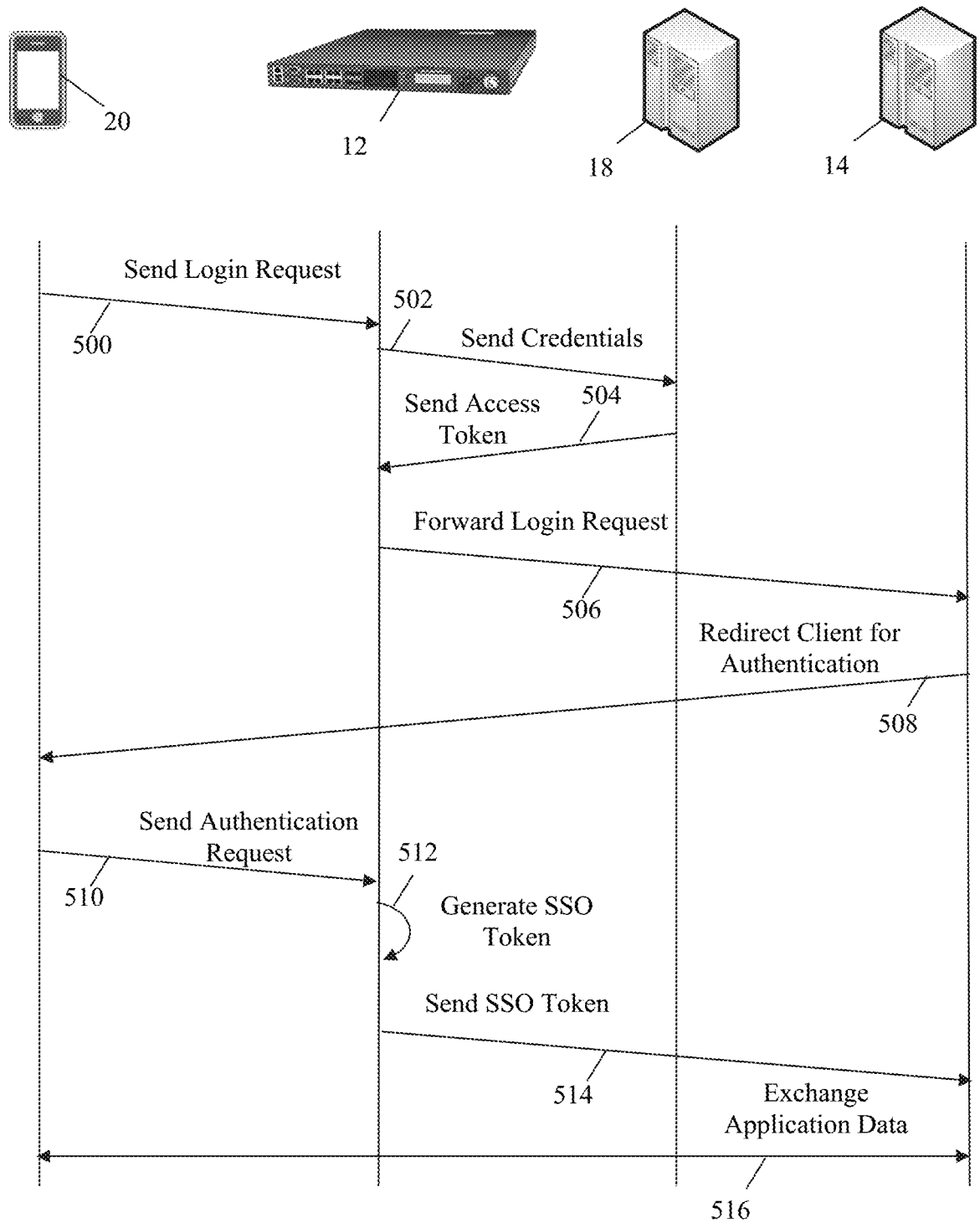
FIG. 5 is a timing diagram of an exemplary method for facilitating federated SSO for internal web applications using external authentication.

Referring more specifically to FIG. 5, a timing diagram of an exemplary method for facilitating federated SSO for internal web applications using external authentication via the identity provider device 18 is illustrated. In step 500 in this example, the client device 12 sends a login request toward a web application hosted by the internal application server 14, which is intercepted by the secure proxy apparatus 12. The login request in this example includes at least credentials for a user of the client device 20.

In step 502, the secure proxy apparatus 12 sends the credentials extracted from the login request to the identity provider device 18 to facilitate authentication of the user. In another example, the secure proxy apparatus 12 can perform a local authentication, as described and illustrated in more detail earlier with reference to FIG. 3. In yet other examples, the secure proxy apparatus 12 can redirect the client device 20 to the identity provider device 18 in response to the login request where the credentials for the user of the client device 20 are collected by the identity provider device 18.

In step 504, the identity provider device 18 sends an access token to the secure proxy apparatus 12. Accordingly, in this example, the identity provider device 18 authenticated the user and provided an access token, optionally following an authorization grant and request from the secure proxy apparatus 12 for the access token. In other examples, the identity provider device 18 may be unable to authenticate the user, in which case an authorization denial may be communicated to the secure proxy apparatus 12, which may drop or otherwise deny the login request, for example.

Since the user is authorized in this example, following receipt of the access token and in step 506, the secure proxy apparatus 12 forwards the login request to the internal application server 14. Prior to forwarding the login request, the secure proxy apparatus 12 optionally validates the user by confirming that the user is authorized to access the web application based on a scope in the access token, for example, although in other examples the validation can be performed in other ways, including by the identity provider device 18.

In step 508, the internal application server 14 sends a redirect request to the client device 20 to redirect the client device 20 for authentication. Following the redirect request, the client device 20 sends an authentication request to the secure proxy apparatus 12 in step 510.

In step 512, the secure proxy apparatus 12 generates an SSO token based on security attribute data obtained from the access token, login request, and/or one or more AAA queries or sources, for example, and other sources of security attribute data can also be used in other examples. The SSO token is generated based on the requirements of the web application and is configured to be validated or accepted by the web application.

In step 514, the secure proxy apparatus 12 sends the generated SSO token to the web application hosted by the internal application server 14 along with the login request received from the client device 20 in step 500. The web application accepts or validates the SSO token and sends an acceptance in response to the login request as part of a secure exchange of application data in an established session facilitated and proxied by the secure proxy apparatus in step 516.

Accordingly, with this technology, client devices on external communication network(s) (e.g., the Internet) can securely access web applications hosted by application servers on internal communication network(s) using SSO. In particular, an intermediary secure proxy apparatus advantageously authenticates and validates users prior to communication by the client devices with the internal application servers. For authenticated and validated users, the secure proxy apparatus generates SSO tokens to facilitate access by the users to web applications hosted by the internal application servers.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for federated single sign-on (SSO) implemented by a network security system comprising one or more secure proxy apparatuses, identity provider devices, application servers, or client devices, the method comprising:
   authenticating a user in response to a request to access a web application received from a client, validating that the authenticated user is authorized to access the web application, and obtaining security attribute data comprising an indication of the accessible web application for the user subsequent to the validation;
   forwarding the received access request to an internal application server hosting the web application and receiving an authentication request in response to the forwarded access request; and
   generating an SSO token based on the obtained security attribute data and sending the generated SSO token to the internal application server in response to the received authentication request to facilitate access to the web application by the user.

2. The method of claim 1, wherein the access request is received from the client via an external communication network and forwarded to the internal application server via an internal communication network.

3. The method of claim 1, further comprising redirecting the client to an identity provider device configured to collect credentials for the user, or sending the credentials for the user extracted from the received access request to the identity provider device, in order to facilitate the authentication of the user.

4. The method of claim 1, wherein the authentication request is received from the client following redirection of the client for authentication by the internal application server and the method further comprises generating the SSO token based on at least a portion of the obtained security attribute data.

5. The method of claim 1, further comprising:
   initiating an authentication, authorization, and accounting (AAA) query based on contents of the received access request including credentials for the user;
   receiving a response to the AAA query; and
   authenticating or validating the user based on the received response to the AAA query.

6. A secure proxy apparatus, comprising memory comprising programmed instructions stored thereon and one or more processors configured to be capable of executing the stored programmed instructions to:

authenticate, by a network security device, a user in response to a request to access a web application received from a client, validate that the authenticated user is authorized to access the web application, and obtain security attribute data comprising an indication of the accessible web application for the user subsequent to the validation;

forward, by the network security device, the received access request to an internal application server hosting the web application and receive an authentication request in response to the forwarded access request; and generate, by the network security device, an SSO token based on the obtained security attribute data and send the generated SSO token to the internal application server in response to the received authentication request to facilitate access to the web application by the user.

7. The secure proxy apparatus of claim 6, wherein the access request is received from the client via an external communication network and forwarded to the internal application server via an internal communication network.

8. The secure proxy apparatus of claim 6, wherein the processors are further configured to be capable of executing the stored programmed instructions to redirect, by the network security device, the client to an identity provider device configured to collect credentials for the user, or send the credentials for the user extracted from the received access request to the identity provider device, in order to facilitate the authentication of the user.

9. The secure proxy apparatus of claim 6, wherein the authentication request is received from the client following redirection of the client for authentication by the internal application server and the processors are further configured to be capable of executing the stored programmed instructions to generate, by the network security device, the SSO token based on at least a portion of the obtained security attribute data.

10. The secure proxy apparatus of claim 6, wherein the processors are further configured to be capable of executing the stored programmed instructions to:

initiate, by the network security device, an authentication, authorization, and accounting (AAA) query based on contents of the received access request including credentials for the user;

receive, by the network security device, a response to the AAA query; and authenticate, by the network security device, or validate the user based on the received response to the AAA query.

11. A non-transitory computer readable medium having stored thereon instructions for federated single sign-on (SSO) comprising executable code that, when executed by one or more processors, causes the processors to:

authenticate a user in response to a request to access a web application received from a client, validate that the authenticated user is authorized to access the web application, and obtain security attribute data comprising an indication of the accessible web application for the user subsequent to the validation;

forward the received access request to an internal application server hosting the web application and receive an authentication request in response to the forwarded access request; and generate an SSO token based on the obtained security attribute data and send the generated SSO token to the internal application server in response to the received authentication request to facilitate access to the web application by the user.

12. The non-transitory computer readable medium of claim 11, wherein the access request is received from the client via an external communication network and forwarded to the internal application server via internal communication network.

13. The non-transitory computer readable medium of claim 11, wherein the executable code, when executed by the processors, further causes the processors to redirect the client to an identity provider device configured to collect credentials for the user, or send the credentials for the user extracted from the received access request to the identity provider device, in order to facilitate the authentication of the user.

14. The non-transitory computer readable medium of claim 11, wherein the authentication request is received from the client following redirection of the client for authentication by the internal application server and the executable code, when executed by the processors, further causes the processors to generate the SSO token based on at least a portion of the obtained security attribute data.

15. The non-transitory computer readable medium of claim 11, wherein the executable code, when executed by the processors, further causes the processors to:

initiate an authentication, authorization, and accounting (AAA) query based on contents of the received access request including credentials for the user;

receive a response to the AAA query; and authenticate or validate the user based on the received response to the AAA query.

16. A network security system, comprising one or more secure proxy apparatuses, identity provider devices, application servers, or client devices with memory comprising programmed instructions stored thereon and one or more processors configured to be capable of executing the stored programmed instructions to:

authenticate, by a network security device, a user in response to a request to access a web application received from a client, validate that the authenticated user is authorized to access the web application, and obtain security attribute data comprising an indication of the accessible web application for the user subsequent to the validation;

forward, by the network security device, the received access request to an internal application server hosting the web application and receive an authentication request in response to the forwarded access request; and generate, by the network security device, an SSO token based on the obtained security attribute data and send the generated SSO token to the internal application server in response to the received authentication request to facilitate access to the web application by the user.

17. The network security system of claim 16, wherein the access request is received from the client via an external communication network and forwarded to the internal application server via an internal communication network.

18. The network security system of claim 16, wherein the processors are further configured to be capable of executing the stored programmed instructions to redirect, by the network security device, the client to an identity provider device configured to collect credentials for the user, or send the credentials for the user extracted from the received access request to the identity provider device, in order to facilitate the authentication of the user.

19. The network security system of claim 16, wherein the authentication request is received from the client following redirection of the client for authentication by the internal application server and the processors are further configured to be capable of executing the stored programmed instructions to generate, by the network security device, the SSO token based on at least a portion of the obtained security attribute data.

20. The network security system of claim 16, wherein the processors are further configured to be capable of executing the stored programmed instructions to:
- initiate, by the network security device, an authentication, authorization, and accounting (AAA) query based on contents of the received access request including credentials for the user;
- receive, by the network security device, a response to the AAA query; and
- authenticate or validate, by the network security device, the user based on the received response to the AAA query.

* * * * *